(12) United States Patent
Wang et al.

(10) Patent No.: US 8,713,242 B2
(45) Date of Patent: Apr. 29, 2014

(54) CONTROL METHOD AND ALLOCATION STRUCTURE FOR FLASH MEMORY DEVICE

(75) Inventors: Chih-Hung Wang, Yulin County (TW); Chao-Han Wu, Hsinchu County (TW); Ting-Chung Hu, Saratoga, CA (US)

(73) Assignee: Solid State System Co., Ltd., Hsinchu (TW)

( * ) Notice: Subject to any disclaimer, the term of this patent is extended or adjusted under 35 U.S.C. 154(b) by 486 days.

(21) Appl. No.: 12/981,499

(22) Filed: Dec. 30, 2010

(65) Prior Publication Data

US 2012/0173791 A1    Jul. 5, 2012

(51) Int. Cl.
*G06F 12/02* (2006.01)

(52) U.S. Cl.
USPC ............ 711/103; 711/157; 711/E21.008; 711/E12.079

(58) Field of Classification Search
None
See application file for complete search history.

(56) References Cited

U.S. PATENT DOCUMENTS

| | | | |
|---|---|---|---|
| 6,721,843 B1 * | 4/2004 | Estakhri | 711/103 |
| 2005/0015539 A1 * | 1/2005 | Horii et al. | 711/157 |
| 2010/0275050 A1 * | 10/2010 | Hong | 711/103 |
| 2010/0293305 A1 * | 11/2010 | Park et al. | 711/170 |
| 2011/0060866 A1 * | 3/2011 | Kawano et al. | 711/157 |

* cited by examiner

*Primary Examiner* — Michael Krofcheck
(74) *Attorney, Agent, or Firm* — Jianq Chyun IP Office

(57) ABSTRACT

A control method and an allocation structure for a flash memory device are provided herein. The flash memory device has a first memory module and a second memory module. Physical blocks of the first memory module and physical blocks of the second memory module are respectively divided into a plurality of groups, each of which has a plurality of the physical blocks. A first subunit and a second subunit of a first allocation unit are interleavingly written into a first group of the groups of the first memory module and a second group of the groups of the second memory chip respectively. Additionally, a first subunit and a second subunit of a second allocation unit are interleavingly written into a third group of the groups of the first memory module and the second group, respectively.

17 Claims, 15 Drawing Sheets

CONTROL METHOD AND ALLOCATION STRUCTURE FOR FLASH MEMORY DEVICE

BACKGROUND

1. Field of the Invention

The invention relates to a control method and an allocation structure for a flash memory device. Particularly, the invention relates to a control method and an allocation structure for a flash memory device having a plurality of memory modules.

2. Description of Related Art

A flash memory is one kind of non-volatile memories, which can maintain stored data without power. The flash memories are categorized into NOR flash memories and NAND flash memories. Moreover, the flash memories can also be categorized into single level cell (SLC) flash memories and multi level cell (MLC) flash memories according to an amount of bits capable of being stored in a single memory cell. Wherein, the "single level" represents that each of the memory cells can only record data of one bit, and the "multi level" represents that each of the memory cells can record data of multiple bits. Since the MLC can record more data bits compared to the SLC, the MLC has to distinguish values of the stored data according to more different threshold voltage distributions.

A data writing rate is one of indicators for assessing a quality of a flash memory. Generally, a flash memory with a fast data writing rate is regarded as a good quality memory, and a flash memory with a slow data writing rate is regarded as a poor quality flash memory. Regarding the MLC flash memory, since a plurality of bits is stored in a single memory cell thereof, during a data writing process, relatively more time is required for programming the memory cells. Therefore, compared to the SLC flash memory, the data writing rate of the MLC flash memory is relatively slow.

Moreover, to facilitate managing the flash memory, the flash memory is generally divided into a plurality of allocation units (AUs), and each of the allocation units has one or more physical blocks. A maximum capacity of the allocation unit relates to a total capacity of the flash memory. Taking a memory card with a total capacity of 512 MB (megabytes) as an example, a maximum capacity of an allocation unit thereof is 2 MB, and taking a memory card with a total capacity of 1 GB-32 GB (gigabytes) as an example, a maximum capacity of an allocation unit thereof is 4 MB. Generally, when data is about to be written into the memory, a controller may write the data into the memory according to the capacity of the allocation unit.

On the other hand, regarding secure digital (SD) memory cards, data writing rates of the SD memory cards are uniformly defined into a plurality of classes by various manufactures. For example, regarding a SD memory card of a class 0, a relatively long data writing delay is allowed, and a data writing rate thereof is not particularly required. Regarding a SD memory card of a class 2, a data writing rate thereof is at least 2 MB per second. Regarding a SD memory card of a class 4, a data writing rate thereof is at least 4 MB per second, and regarding a SD memory card of a class 6, a data writing rate thereof is at least 6 MB per second.

Further, when a SD memory card is complied with a requirement of a certain class, it means that regardless of writing data into any allocation unit of the SD memory card, a data writing rate thereof is not less than a minimum data writing rate required by the corresponding class.

Moreover, the controller of the flash memory may group the physical blocks of one or more memories into one group to serve as a basic unit maintaining a data writing operation of the flash memory. Generally, a capacity of a single group grouped by the controller is equal to the maximum capacity of the allocation unit, so as to achieve a better performance of the flash memory.

Referring to FIG. 1, FIG. 1 is a schematic diagram illustrating a process of writing a data string 100 into a flash memory module 150 according to a conventional technique. The data string 100 has a plurality of allocation units (for example, allocation units 110_1-110_4). Each of the allocation units has data of 4 MB. The flash memory module 150 has a plurality of physical blocks (for example, physical blocks 160_1-160_16). A capacity of each of the physical blocks is 1 MB, and each four physical blocks form a group. A data amount of each allocation unit is equal to a capacity of one group (i.e. a capacity of four physical blocks). Each of the allocation units can be divided into four parts of data, and each part of data is equal to 1 MB. Taking the allocation unit 110_1 as an example, it has a first part of data 110_11, a second part of data 110_12, a third part of data 110_13 and a fourth part of data 110_14, and the four parts of data 110_11-110_14 of the allocation unit 110_1 are sequentially written into the four physical blocks 160_1-160_4 of a same group. Similarly, as shown in FIG. 1, four parts of data 110_21-110_24 of the allocation unit 110_2 are sequentially written into the four physical blocks 160_5-160_8. Four parts of data 110_31-110_34 of the allocation unit 110_3 are sequentially written into the four physical blocks 160_9-160_12. Four parts of data 110_41-110_44 of the allocation unit 110_4 are sequentially written into the four physical blocks 160_13-160_16.

Referring to FIG. 2, FIG. 2 is a schematic diagram illustrating a process of writing the data string 100 into a flash memory 200 according to a conventional technique. The flash memory 200 has a first memory module 210 and a second memory module 220. Each of the memory modules of the flash memory 200 has a plurality of physical blocks, and a capacity of each physical block is 1 MB. For example, the first memory module 210 includes a plurality of physical blocks 230_1-230_8, and the second memory module 220 includes a plurality of physical blocks 240_1-240_8. When the data string 100 is written into the flash memory 200, the four parts of data 110_11-110_14 of the allocation unit 110_1 are written into the two physical blocks 230_1 and 230_2 of the first memory module 210 and the two physical blocks 240_1 and 240_2 of the second memory module 220. Similarly, the four parts of data 110_21-110_24 of the allocation unit 110_2 are written into the physical blocks 230_3, 230_4, 240_3 and 240_4. The four parts of data 110_31-110_34 of the allocation unit 110_3 are written into the physical blocks 230_5, 230_6, 240_5 and 240_6. The four parts of data 110_41-110_44 of the allocation unit 110_4 are written into the physical blocks 230_7, 230_8, 240_7 and 240_8.

Referring to FIG. 3, FIG. 3 is a schematic diagram illustrating a process of writing the data string 100 into a flash memory 300 according to a conventional technique. The flash memory 300 has a first memory module 310 and a second memory module 320. Each of the memory modules of the flash memory 300 has a plurality of physical blocks, and a capacity of each physical block is 1.5 MB. The first memory module 310 includes a plurality of physical blocks 330_1-330_8, and the second memory module 320 includes a plurality of physical blocks 340_1-340_8. Now, the data amount of 4 MB of each allocation unit cannot be opportunely formed by an integral multiple of the physical blocks of the 1.5 MB. Therefore, the invention provides a solution, by which a memory capacity is not wasted, and meanwhile a data writing rate for writing data into each of the allocation units is even, so as to comply with the data writing rate requirement of the memory card (for example, the SD memory card).

SUMMARY OF THE INVENTION

The invention is directed to a control method for a flash memory device, which can write data into a first memory module and a second memory module of the flash memory device according to a predetermined data writing method, so that a whole data writing rate can meet a requirement of an expected rate.

The invention is directed to an allocation structure for a flash memory device, by which a plurality of allocation units (AUs) written into the flash memory device are asymmetrically stored into physical blocks of a first memory module and a second memory module of the flash memory device.

The invention provides a control method for a flash memory device. The flash memory device includes a first memory module and a second memory module. The control method is described as follows. A plurality of physical blocks of the first memory module are divided into a plurality of groups, and a plurality of physical blocks of the second memory module are divided into a plurality of groups, and each of the groups of the first memory has a plurality of the physical blocks of the first memory and each of the groups of the second memory has a plurality of the physical blocks of the second memory. A first subunit of a first allocation unit is written into a first group of the groups of the first memory module, and a second subunit of the first allocation unit is written into a second group of the groups of the second memory module, where the first subunit of the first allocation unit and the second subunit of the first allocation unit are interleavingly written into the first group and the second group. Additionally, a third subunit and a fourth subunit of the first allocation unit are sequentially written into the first group.

The invention provides an allocation structure for a flash memory device. The flash memory device includes a first memory module and a second memory module. The first memory module and the second memory module respectively have a plurality of groups, and each of the groups has a plurality of physical blocks. The allocation structure includes a first zone. The first zone is used to store a first allocation unit, and is formed by a first group of the groups of the first memory module and a first part of a second group of the groups of the second memory module.

The invention provides a control method for a flash memory device. The flash memory device includes a first memory module and a second memory module. The control method includes receiving at least one allocation unit and separately writing the received allocation unit into the first memory module and the second memory module. A data amount of the allocation unit written into the first memory module is unequal to a data amount of the allocation unit written into the second memory module.

In an embodiment of the invention, the control method further includes writing a first subunit of a second allocation unit into a third group of the groups of the first memory module, and writing a second subunit of the second allocation unit into the second group. The first subunit of the second allocation unit and the second subunit of the second allocation unit are interleavingly written into the third group and the second group.

In an embodiment of the invention, the control method further includes writing a third subunit of the second allocation unit into the third group, and writing a fourth subunit of the second allocation unit into the second group, where the third subunit of the second allocation unit and the fourth subunit of the second allocation unit are interleavingly written into the third group and the second group.

In an embodiment of the invention, the control method further includes writing a first subunit of a third allocation unit into a third group of the groups of the first memory module, and writing a second subunit of the third allocation unit into a fourth group of the groups of the second memory module, where the first subunit of the third allocation unit and the second subunit of the third allocation unit are interleavingly written into the third group and the fourth group.

In an embodiment of the invention, the control method further includes sequentially writing a third subunit and a fourth subunit of the third allocation unit into the fourth group.

In an embodiment of the invention, the control method further includes sequentially writing a third subunit and a fourth subunit of the second allocation unit into the third group.

In an embodiment of the invention, the control method further includes writing a first subunit of a third allocation unit into a fifth group of the groups of the first memory module, and writing a second subunit of the third allocation unit into the second group, where the first subunit of the third allocation unit and the second subunit of the third allocation unit are interleavingly written into the fifth group and the second group.

In an embodiment of the invention, the control method further includes sequentially writing a third subunit and a fourth subunit of the third allocation unit into the fifth group.

In an embodiment of the invention, the control method further includes writing a first subunit of a fourth allocation unit into a seventh group of the groups of the first memory module, and writing a second subunit of the fourth allocation unit into a fourth group of the groups of the second memory module, where the first subunit of the fourth allocation unit and the second subunit of the fourth allocation unit are interleavingly written into the seventh group and the fourth group.

In an embodiment of the invention, the control method further includes writing a first subunit of a fifth allocation unit into the seventh group, and writing a second subunit of the fifth allocation unit into a sixth group of the groups of the second memory module, where the first subunit of the fifth allocation unit and the second subunit of the fifth allocation unit are interleavingly written into the seventh group and the sixth group.

In an embodiment of the invention, the control method further includes writing a first subunit of a fourth allocation unit into a seventh group of the groups of the first memory module, and writing a second subunit of the fourth allocation unit into a fourth group of the groups of the second memory module, where the first subunit of the fourth allocation unit and the second subunit of the fourth allocation unit are interleavingly written into the seventh group and the fourth group; and copying the second subunit of the first allocation unit stored in the second group to the fourth group.

In an embodiment of the invention, the step of copying the second subunit of the first allocation unit stored in the second group to the fourth group comprises copying the second subunit of the first allocation unit and the second subunit of the third allocation unit stored in the second group to the fourth group.

In an embodiment of the invention, the step of simultaneously writing a third subunit of the fourth allocation unit into the seventh group when the second subunit of the first allocation unit stored in the second group are copied to the fourth group comprises simultaneously writing the third subunit and a fourth subunit of the fourth allocation unit into the seventh group when the second subunit of the first allocation unit and the second subunit of the third allocation unit stored in the second group are copied to the fourth group.

In an embodiment of the invention, the control method further includes when a subunit of a certain allocation unit is written into one of the physical blocks of the first memory module, simultaneously performing an operation to copy and move data stored in the second memory module.

In an embodiment of the invention, data of one of the allocation units is of unequal-size stored in the physical blocks of the first memory module and the second memory module.

In an embodiment of the invention, the flash memory device is a secure digital (SD) memory card.

In an embodiment of the invention, the first memory module and the second memory module are two memory chips independent from each other.

In an embodiment of the invention, the first memory module and the second memory module are two memory planes independent from each other, and are belonged to a same memory chip.

In an embodiment of the invention, the allocation structure further includes a second zone. The second zone is used to store a second allocation unit, and is formed by a third group of the groups of the first memory module and a second part of the second group of the second memory module.

In an embodiment of the invention, the allocation structure further includes a third zone. The third zone is used for storing a third allocation unit, and the third zone is formed by a fifth group of the groups of the first memory module and a third part of the second group of the second memory module.

In an embodiment of the invention, the allocation structure further includes a second zone. The second zone is used to store a second allocation unit, and is formed by a first part and a second part of a third group of the groups of the first memory module and a second part and a third part of the second group of the second memory module.

In an embodiment of the invention, the allocation structure further includes a third zone. The third zone is used for storing a third allocation unit, and the third zone is formed by a third part of the third group of the first memory module and a fourth group of the groups of the second memory module.

According to the above descriptions, data is written into the first memory module and the second memory module of the flash memory device according to a predetermined data writing method, so that a whole data writing rate can meet a requirement of an expected rate. Moreover, by planning the memory zones, the capacity of the memory can be effectively utilized.

In order to make the aforementioned and other features and advantages of the invention comprehensible, several exemplary embodiments accompanied with figures are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF DISCLOSED EMBODIMENTS

Figure 1:
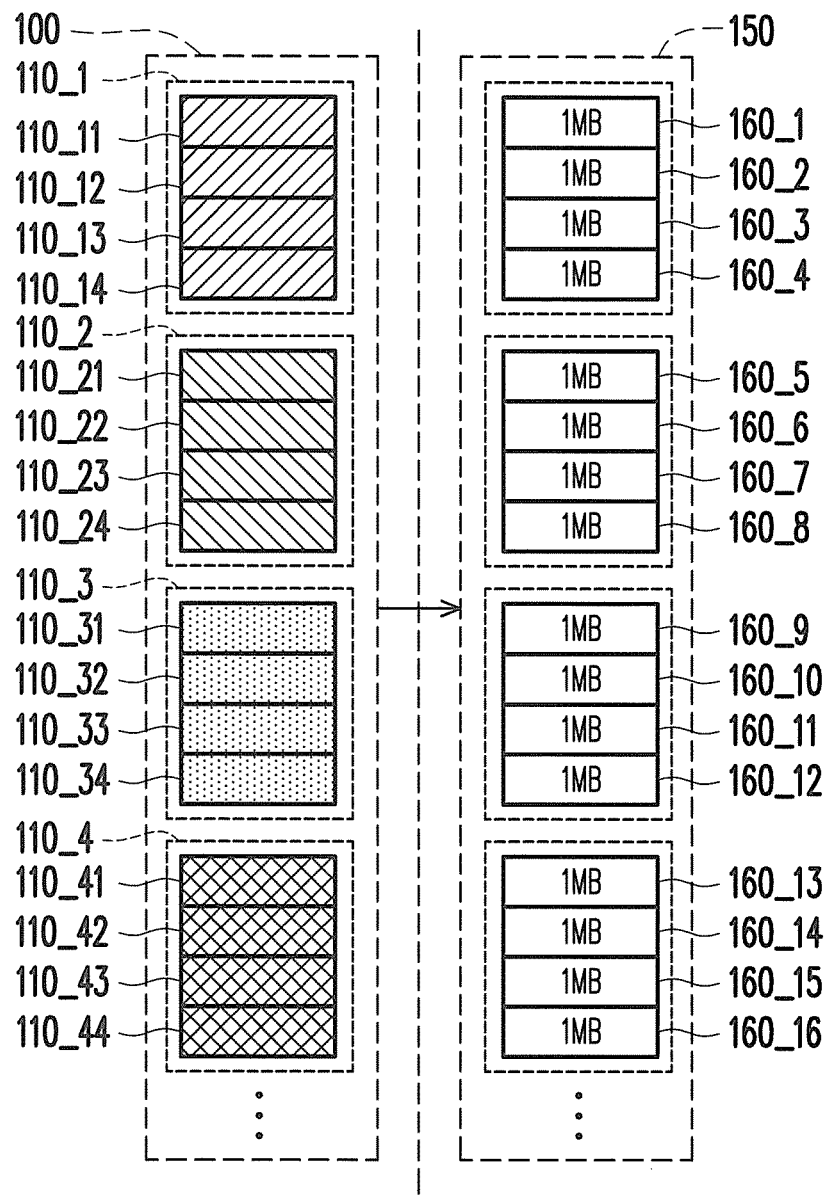
FIG. 1 is a schematic diagram illustrating a process of writing a data string into a flash memory module according to a conventional technique.
Figure 2:
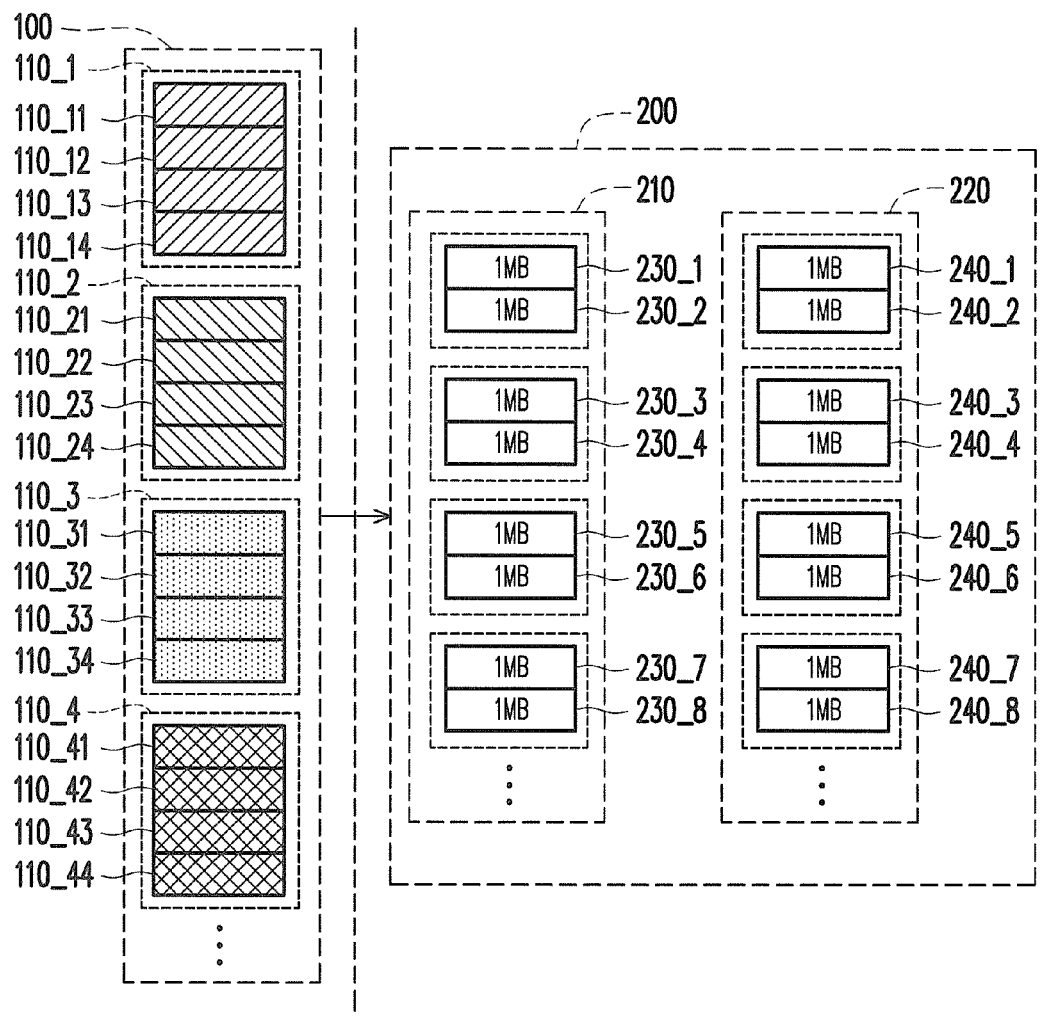
FIG. 2 and FIG. 3 are schematic diagrams respectively illustrating a process of writing a data string into a flash memory according to a conventional technique.
Figure 3:
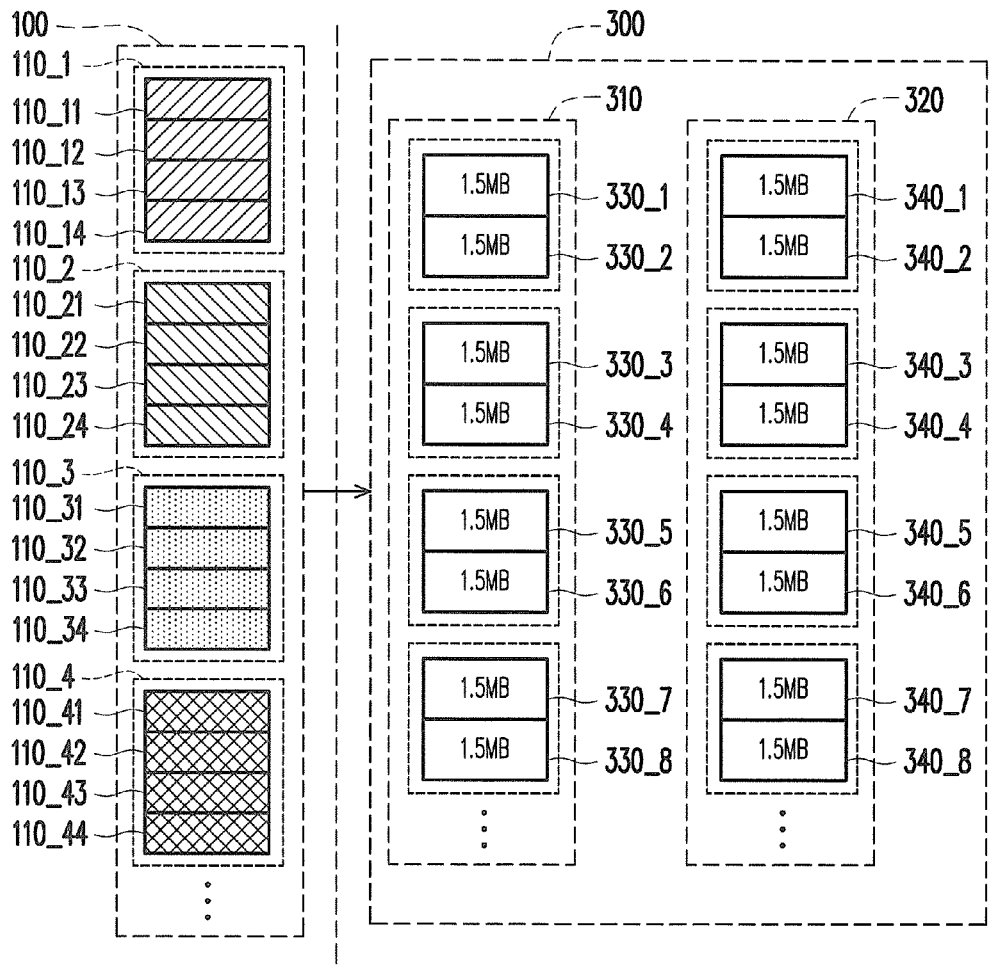
Figure 4:
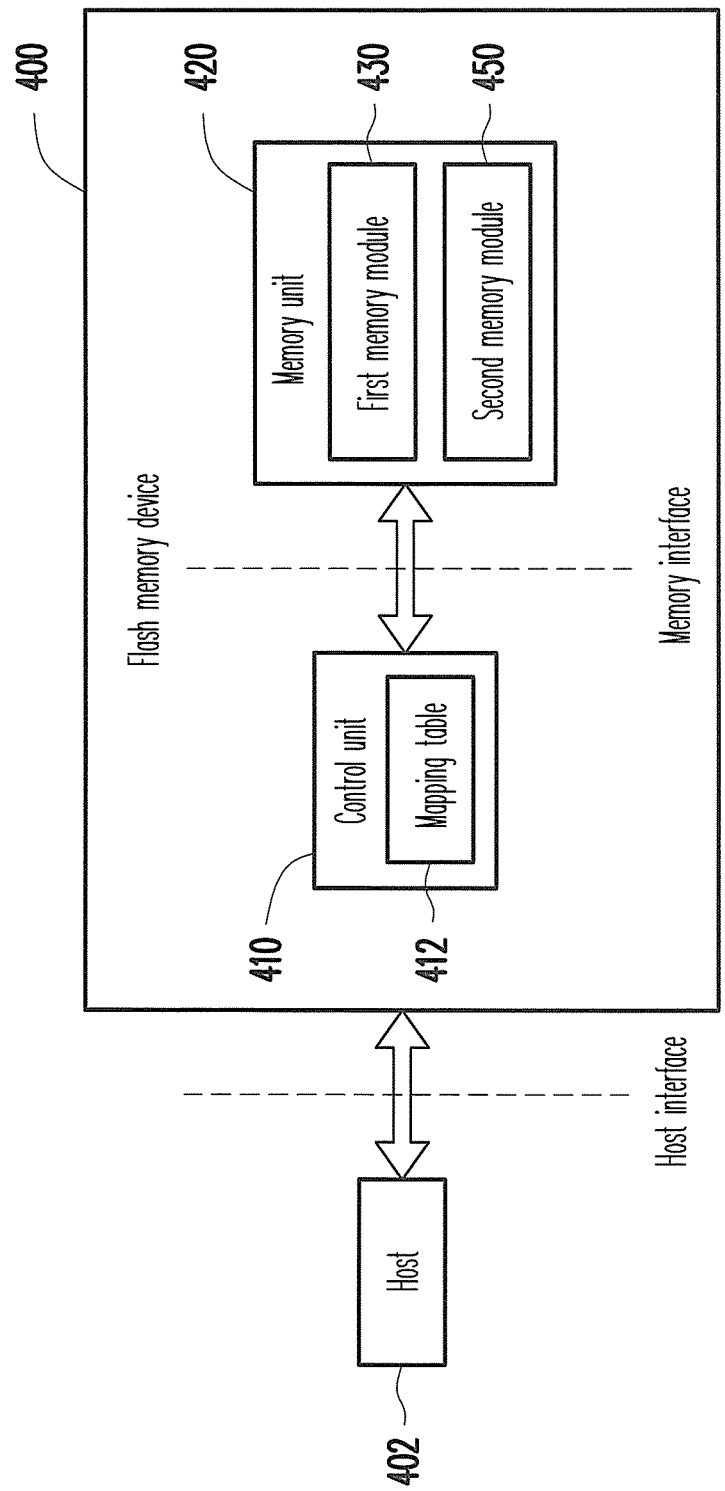
FIG. 4 is a functional block diagram illustrating a flash memory device applying a control method of an embodiment of the invention.

Referring to FIG. 4, FIG. 4 is a functional block diagram illustrating a flash memory device 400 applying a control method of an embodiment of the invention. In the present embodiment, the flash memory device 400 is a secure digital (SD) memory card, though the invention is not limited thereto, and the flash memory device 400 can be a memory device of other specifications, for example, a compact flash (CF) memory card, a multimedia card (MMC) or a memory stick.

The flash memory device 400 is coupled to a host 402 through a host interface for receiving commands and data from the host 402 and transmitting read data to the host 402. The flash memory device 400 has a control unit 410 and a memory unit 420. The control unit 410 is used for controlling operations of the flash memory device 400 (for example, data writing and reading operations performed to the flash memory unit 420). The memory unit 420 has a first memory module 430 and a second memory module 450 for storing data. The control unit 410 accesses the memory unit 420 through a memory interface. Moreover, the control unit 410 has a mapping table 412 for mapping logical addresses to physical addresses of the first memory module 430 and the second memory module 450. For example, when the host 402 sends a command to the control unit 410 to instruct the control unit 410 to write data into a certain logical address, the control unit 410 finds a physical address corresponding to the logical address from the mapping table 412, and writes the data into the found physical address.

Moreover, it should be noticed that in an embodiment of the invention, the first memory module 430 and the second memory module 450 are two memory chips independent from each other. In addition, in an embodiment of the invention, the first memory module 430 and the second memory module 450 are two memory planes independent from each other, and are belonged to a same memory chip.

Figure 5:
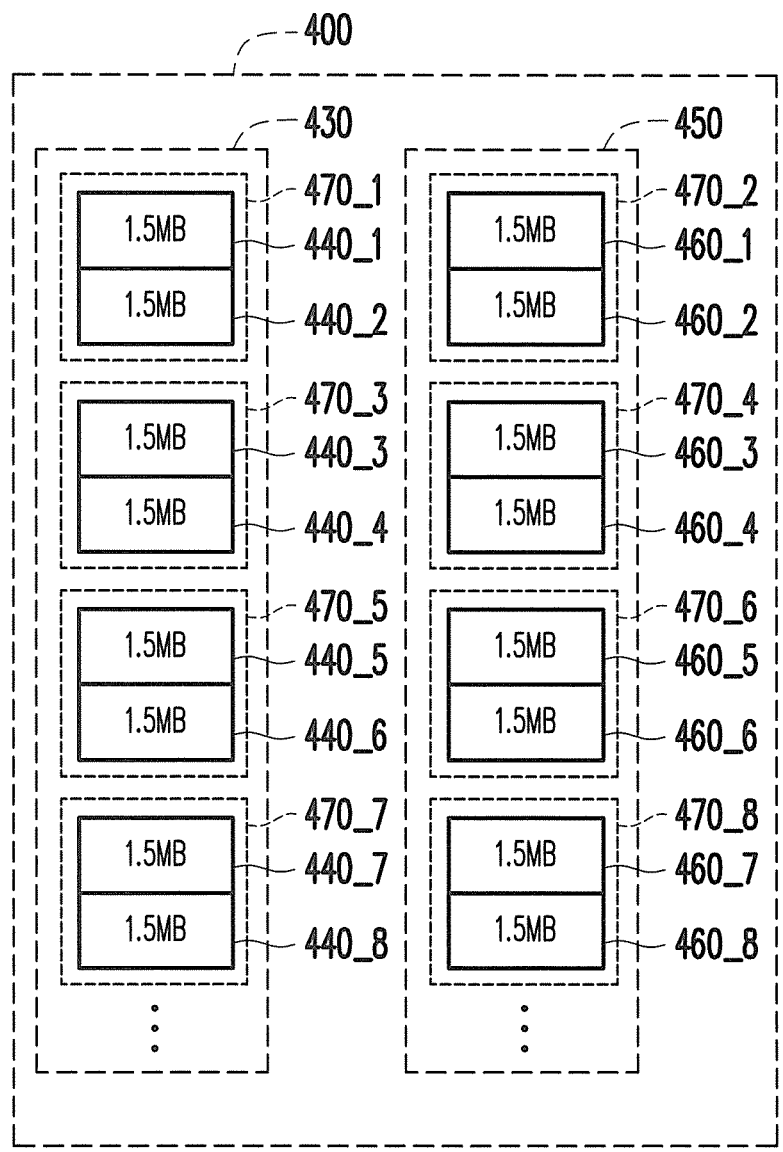
FIG. 5 is a schematic diagram of a first memory module and a second memory module of FIG. 4.

Referring to FIG. 5, FIG. 5 is a schematic diagram of the first memory module 430 and the second memory module 450 of FIG. 4. The first memory module 430 and the second memory module 450 respectively have a plurality of physical blocks. As shown in FIG. 5, the first memory module 430 includes physical blocks 440_1-440_8, and the second memory module 450 includes physical blocks 460_1-460_8. The control unit 410 groups the physical blocks of the first memory module 430 and the second memory module 450 into a plurality of groups, respectively. As shown in FIG. 5, a plurality of the groups of the first memory module 430 includes a first group 470_1, a third group 470_3, a fifth group 470_5 and a seventh group 470_7, etc., and a plurality of groups of the second memory module 450 includes a second group 470_2, a fourth group 470_4, a sixth group 470_6 and an eighth group 470_8, etc. In the present embodiment, each of the groups has two physical blocks, and a capacity of each physical block is 1.5 MB. Each of the physical blocks of the first memory module 430 and the second memory module 450 has a plurality of physical pages, and each of the physical pages has a plurality of memory cells, though the invention is not limited thereto. For example, in an embodiment of the invention, each of the physical blocks has 384 physical pages, and a capacity of each physical page is 8 KB, and a capacity of each physical block is 3 MB.

Figure 6:
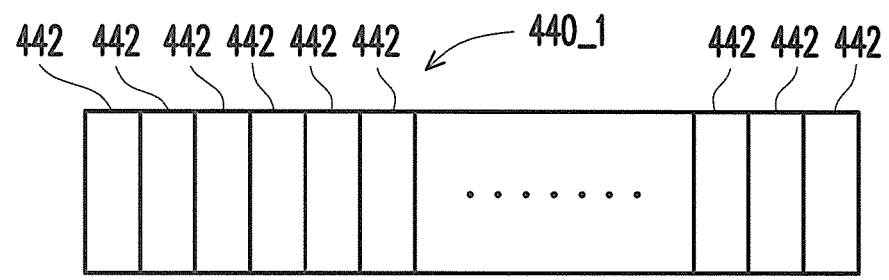
FIG. 6 is a schematic diagram illustrating a physical block of FIG. 5.
Figure 7:
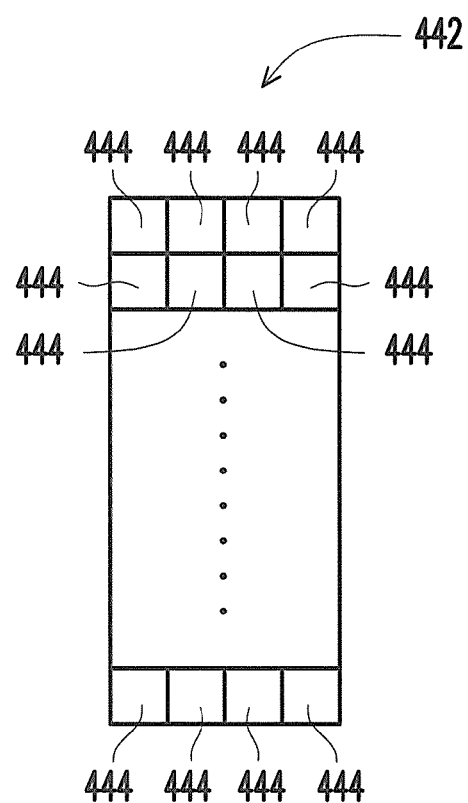
FIG. 7 is a schematic diagram illustrating a single physical page of a physical block of FIG. 5.

Referring to FIG. 6 and FIG. 7, FIG. 6 is a schematic diagram illustrating the physical block 440_1 of FIG. 5, and FIG. 7 is a schematic diagram illustrating a single physical page 442 of the physical block 440_1 of FIG. 5. The physical block 440_1 has a plurality of physical pages 442, and each of the physical pages 442 has a plurality of memory cells 444. In the present embodiment, each of the memory cells 444 may store data of three bits, though the invention is not limited thereto. Moreover, in the present embodiment, a structure of each of the physical blocks of the first memory module 430 and the second memory module 450 is similar to the structure of the physical block 440_1 shown in FIG. 6 and FIG. 7, so that detailed descriptions thereof are not repeated. It should be noticed that due to a characteristic of the flash memory, when data is about to be written into the physical page 442 already written with data, the physical page 442 has to be erased first, where the physical block is a minimum unit for an erase operation, and the physical page 442 is a minimum unit for a program operation (i.e. a write operation). In detail, since the physical page cannot be erased alone, when data of a certain physical page is required to be erased, data stored in the physical block where the physical page is located is all erased. Moreover, the physical pages of the same physical block can be programmed at different time points.

Figure 8:
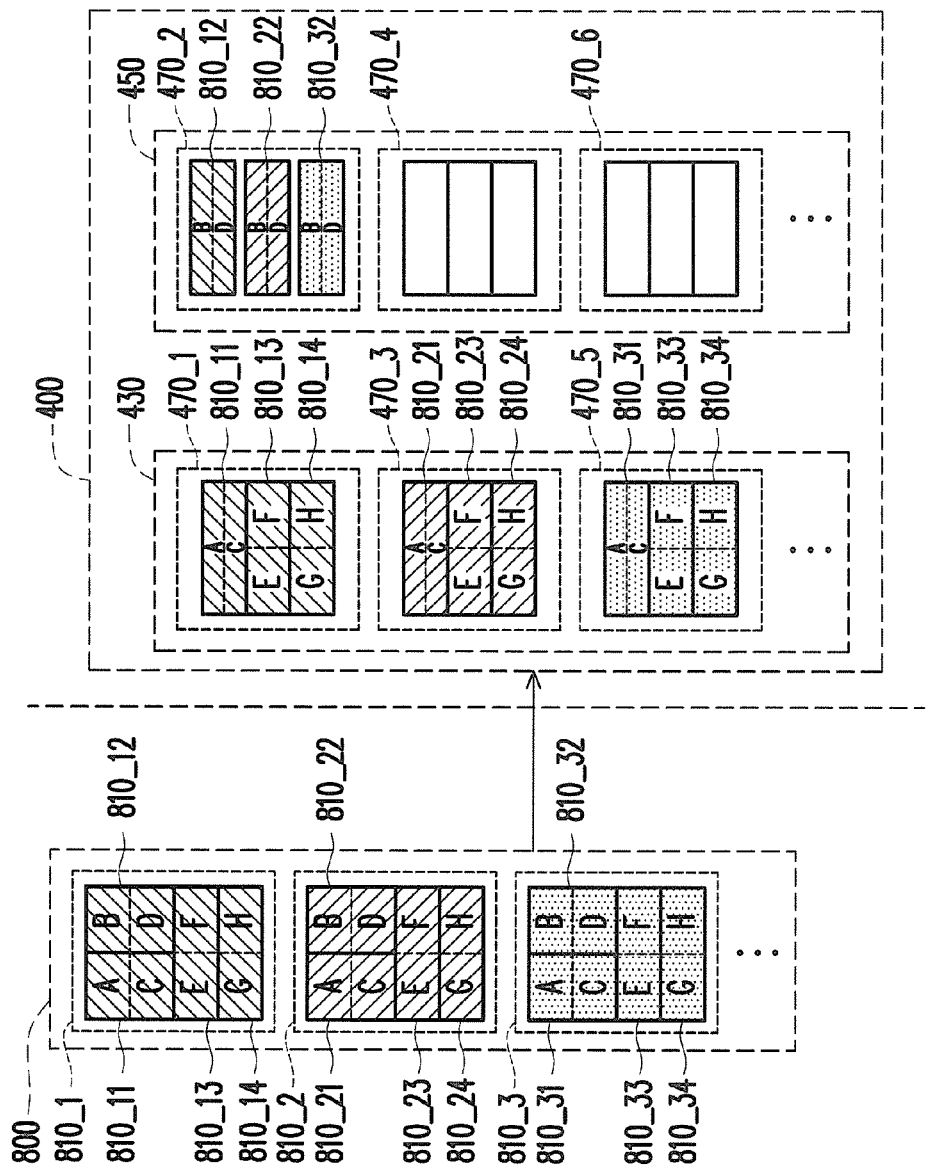
FIG. 8 is a schematic diagram illustrating a process of writing a data string into a flash memory device according to an embodiment of the invention.
Figure 9:
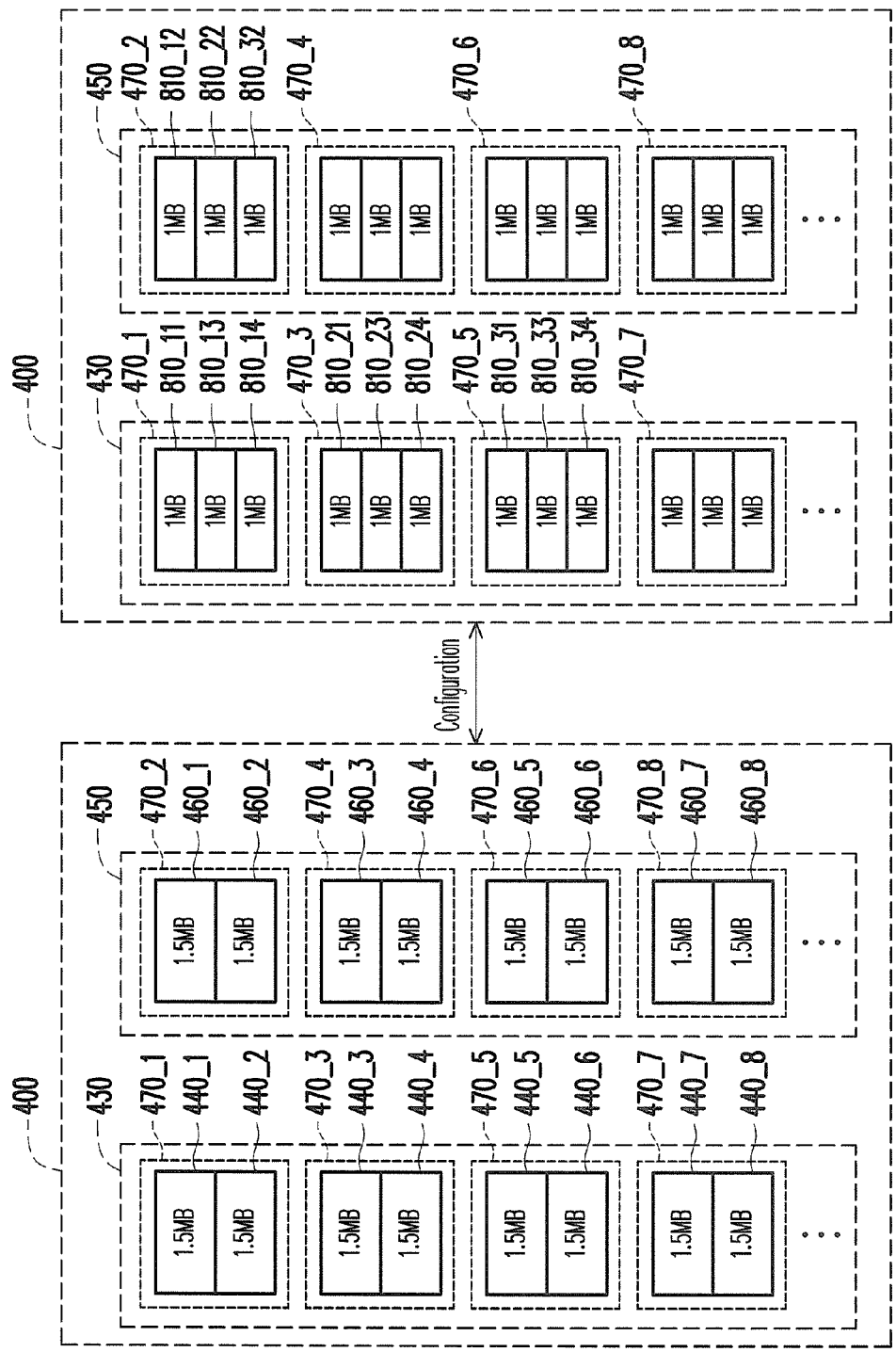
FIG. 9 is a diagram illustrating a configuration of memory spaces of a first memory module and a second memory module.

Referring to FIGS. 8-9 and FIGS. 4-5, FIG. 8 is a schematic diagram illustrating a process of writing a data string 800 into the flash memory device 400, and FIG. 9 is a diagram illustrating a configuration of memory spaces of the first memory module 430 and the second memory module 450. The data string 800 has a plurality of allocation units (for example, allocation units 810_1-810_4). Each of the allocation units has data of 4 MB. Therefore, in the present embodiment, a data amount (4 MB) of each of the allocation units is greater than a data amount (1.5 MB) capable of being stored by each of the physical blocks. Moreover, the size of the data amount of each of the allocation units cannot be formed by an integral multiple of the physical blocks. For example, in the present embodiment, the data amount of 4 MB of each of the allocation units is not an integral multiple of the data amount of 1.5 MB of a single physical block. It should be noticed that the data amount of each of the allocation units and the data amount capable of being stored by each of the physical blocks are only used as an example, and the invention is not limited thereto. In other embodiments of the invention, the data amount of each of the allocation units can be other values.

Each of the allocation units can be divided into four parts of data, and each part of data is equal to 1 MB. For example, the first allocation unit 810_1 has a first part of data 810_11, a second part of data 810_12, a third part of data 810_13 and a fourth part of data 810_14. Similarly, the second allocation unit 810_2 has a first part of data 810_21, a second part of data 810_22, a third part of data 810_23 and a fourth part of data 810_24. The third allocation unit 810_3 has a first part of data 810_31, a second part of data 810_32, a third part of data 810_33 and a fourth part of data 810_34.

As shown in FIG. 9, the two physical blocks of each group are divided into three zones respectively having a capacity of 1 MB, where each of the zones is suitable for storing one part of data of the allocation unit. For example, the first part of data 810_11 of the first allocation unit 810_1 is written into the first zone of the first group 470_1.

When the control unit 410 writes the data string 800 into the memory unit 420, the first part of data 810_11 of the first allocation unit 810_1 is first written into the first group 470_1 of the first memory module 430, and the second part of data 810_12 of the first allocation unit 810_1 is written into the second group 470_2 of the second memory module 450. The control unit 410 interleavingly writes the first part of data 810_11 and the second part of data 810_12 of the first allocation unit 810_1 into the first group 470_1 and the second group 470_2.

Figure 10A:
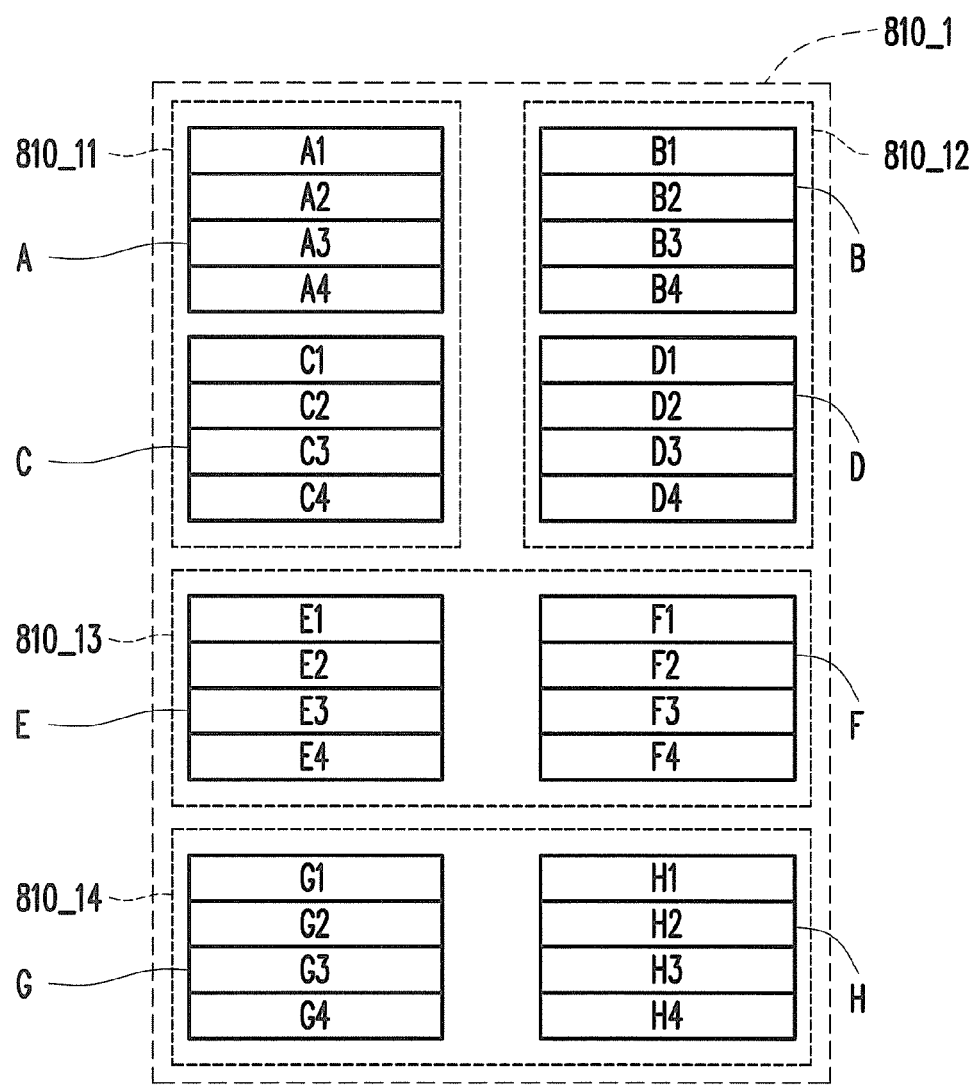
FIG. 10A is a schematic diagram illustrating the first allocation unit of FIG. 8.

FIG. 10A is a schematic diagram illustrating the first allocation unit 810_1 of FIG. 8. Referring to FIG. 10A, the first part of data 810_11 is divided into a first segment A and a second segment C, the second part of data 810_12 is divided into a first segment B and a second segment D, the third part of data 810_13 is divided into a first segment E and a second segment F, and the fourth part of data 810_14 is divided into a first segment G and a second segment H. For the sake of simplifying the descriptions, in the embodiment, each of the segments A-H has data of four physical regions. However, the present invention is not limited thereto. For example, the number of physical regions of each of the segments A-H could be 256, 512, 1024, 2048 or other positive integer. In the embodiment, the first segment A has the data of the four physical regions A1-A4, the second segment B has the data of the four physical regions B1-B4, and so on. It should be noted that the number of the physical regions of each segment in the embodiment is an example, and the data of each of the physical regions includes data of one or two physical pages. The present invention is not limited thereto. Additionally, the sequence of generating the data of the physical regions is A1→B1→A2→B2→A3→B3→A4→B4→C1→D1→C2→D2→C3→D3→C4→D4→E1→F1→E2→F2→E3→F3→E4→F4→G1→H1→G2→H2→G3→H3→G4→H4. The size of each physical region serves as a basic unit for writing (i.e. programming) the physical pages of the first memory module 430 and the second memory module 450. In other words, in response to each command for writing the pages of the memory modules 430 and 450, data of one or two physical pages are written into the memory modules 430 and 450 since each of the physical regions includes data of one or two physical pages. Moreover, alike the first allocation unit

810_1, each of the other allocation units has its own 8 segments A-H, as shown in FIG. 8.

Figure 10B:
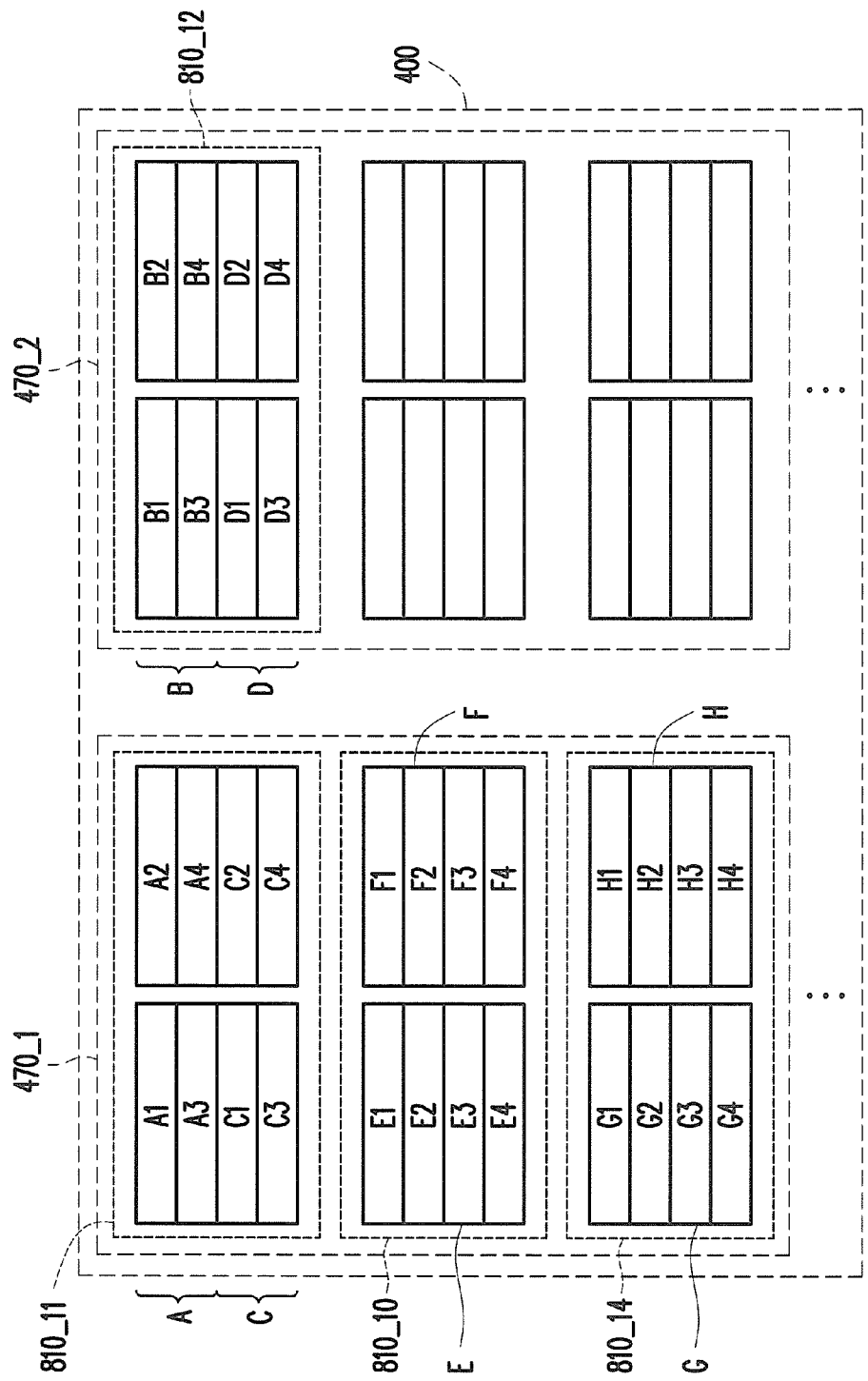
FIG. 10B is a schematic diagram illustrating the flash memory device of FIG. 8.
Figure 10C:
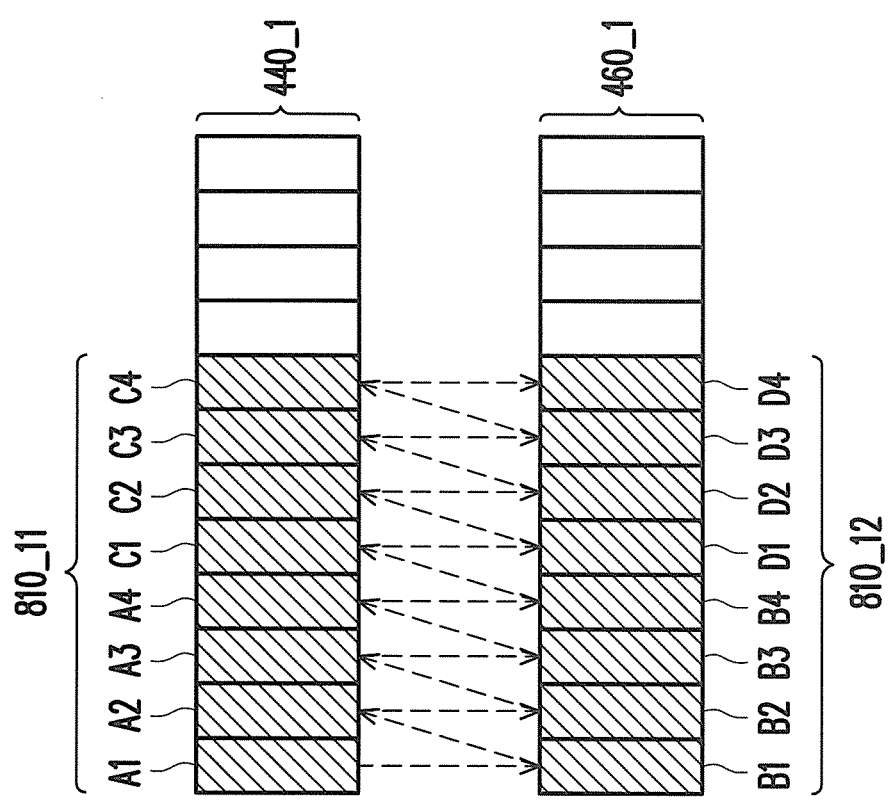
FIG. 10C is a diagram illustrating a process that a control unit interleavingly writes a first part of data and a second part of data of a first allocation unit into a first group and a second group.

Referring to FIG. 10B, FIG. 10C, FIG. 8 and FIG. 9 for a detailed description of how the control unit 410 interleavingly writes data into the memory unit 420. FIG. 10B is a schematic diagram illustrating the flash memory device 400 of FIG. 8, and FIG. 10C is a diagram illustrating a process that the control unit 410 interleavingly writes the first part of data 810_11 and the second part of data 810_12 of the first allocation unit 810_1 into the first group 470_1 and the second group 470_2. As shown in FIG. 10C, the first part of data 810_11 is written into the physical block 440_1 of the first group 470_1, and the second part of data 810_12 is written into the physical block 460_1 of the second group 470_2. The physical blocks 440_1 and 460_1 respectively have physical regions A1-A4 and B1-B4, as shown in FIGS. 10B and 10C. Each of the physical regions includes one or more physical pages. In the present embodiment, each of the physical regions has two physical pages, and each of the physical pages may store data of 8 KB (kilobyte). When the control unit 410 interleavingly writes the first part of data 810_11 and the second part of data 810_12 of the first allocation unit 810_1 into the first group 470_1 and the second group 470_2, the control unit 410 first writes a first batch of data of 16 KB of the first part of data 810_11 into the physical region A1 of the physical block 440_1 of the first memory module 430, and then writes a first batch of data of 16 KB of the second part of data 810_12 into the physical region B1 of the physical block 460_1 of the second memory module 450. Then, a second batch of data of 16 KB of the first part of data 810_11 and a second batch of data of 16 KB of the second part of data 810_12 are sequentially written into the physical region A2 of the physical block 440_1 and the physical region B2 of the physical block 460_1. The others are deduced by analogy until the first part of data 810_11 and the second part of data 810_12 are completely written into the physical block 440_1 of the first memory module 430 and the physical block 460_1 of the second memory module 450. Therefore, when the control unit 410 interleavingly writes the first part of data 810_11 and the second part of data 810_12 of the first allocation unit 810_1 into the first group 470_1 and the second group 470_2, a writing sequence of the physical regions is A1→B1→A2→B2→A3→B3→A4→B4→C1→D1→C2→D2→C3→D3→C4→D4.

Moreover, in an embodiment of the invention, if each of the physical regions only has one physical page, the control unit 410 interleavingly writes the first part of data 810_11 and the second part of data 810_12 into the first group 470_1 and the second group 470_2 while taking 8 KB as a writing unit. In detail, in this embodiment, the control unit 410 first writes a first batch of data of 8 KB of the first part of data 810_11 into the first physical region A1 of the physical block 440_1 of the first memory module 430, and then writes a first batch of data of 8 KB of the second part of data 810_12 into the first physical region B1 of the physical block 460_1 of the second memory module 450. Then, a second batch of data of 8 KB of the first part of data 810_11 and a second batch of data of 8 KB of the second part of data 810_12 are sequentially written into the second physical regions of the physical block 440_1 and the physical block 460_1. The others are deduced by analogy until the first part of data 810_11 and the second part of data 810_12 are completely written into the physical block 440_1 of the first memory module 430 and the physical block 460_1 of the second memory module 450.

It should be noticed that in the above embodiment, a capacity of each physical page is 8 KB, though the invention is not limited thereto, and the capacity of each physical page can also be other values.

Moreover, since capacities of the physical blocks 440_1 and 460_1 are respectively 1.5 MB, and the data amounts of the first part of data 810_11 and the second part of data 810_12 are respectively 1 MB, the first part of data 810_11 and the second part of data 810_12 are only stored in a part of physical regions of the physical blocks 440_1 and 460_1. As shown in FIG. 10C, the first part of data 810_11 is stored in the physical regions A1-A4 and C1-C4 of the physical block 440_1, and the second part of data 810_12 is stored in the physical regions B1-B4 and D1-D4 of the physical block 460_1.

Referring to FIGS. 8-9 and FIGS. 4-5. In the present embodiment, after the first part of data 810_11 and the second part of data 810_12 are interleavingly written into the first group 470_1 and the second group 470_2, the control unit 410 sequentially writes the third part of data 810_13 and the fourth part of data 810_14 of the first allocation unit 810_1 into the first group 470_1. Then, the control unit 410 writes the first part of data 810_21 of the second allocation unit 810_2 into the third group 470_3 of the first memory module 430, and writes the second part of data 810_22 of the second allocation unit 810_2 into the second group 470_2. The first part of data 810_21 and the second part of data 810_22 of the second allocation unit 810_2 are interleavingly written into the third group 470_3 and the second group 470_2. Then, the third part of data 810_23 and the fourth part of data 810_24 of the second allocation unit 810_2 are sequentially written into the third group 470_3.

Figure 11:
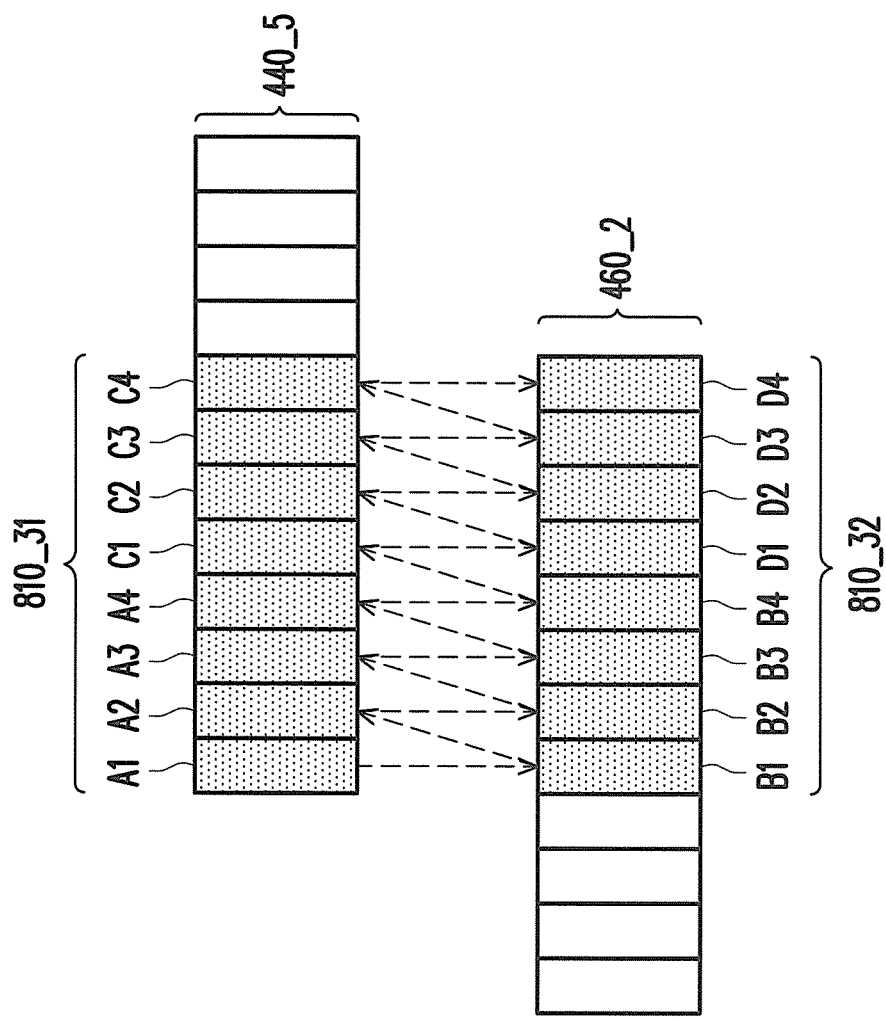
FIG. 11 is a diagram illustrating a process that a control unit interleavingly writes a first part of data and a second part of data of a third allocation unit into a fifth group and a second group.

In an embodiment of the invention, the control unit 410 further writes the first part of data 810_31 of the third allocation unit 810_3 into the fifth group 470_5 of the first memory module 430, and writes the second part of data 810_32 of the third allocation unit 810_3 into the second group 470_2. The first part of data 810_31 and the second part of data 810_32 of the third allocation unit 810_3 are interleavingly written into the fifth group 470_5 and the second group 470_2. Referring to FIG. 11 and FIGS. 8-9, FIG. 11 is a diagram illustrating a process that the control unit 410 interleavingly writes the first part of data 810_31 and the second part of data 810_32 of the third allocation unit 810_3 into the fifth group 470_5 and the second group 470_2. As shown in FIG. 11, the first part of data 810_31 is written into the physical block 440_5 of the fifth group 470_5, and the second part of data 810_32 is written into the physical block 460_2 of the second group 470_2. The physical block 440_5 has the physical regions A1-A4 and C1-C4, and the physical block 460_2 has the physical regions B1-B4 and D1-D4. Each of the physical regions includes one or more physical pages. The first part of data 810_31 is stored in the physical regions A1-A4 and C1-C4 of the physical block 440_5, and the second part of data 810_32 is stored in the physical regions B1-B4 and D1-D4 of the physical block 460_2, and a writing sequence of the physical regions is A1→B1→A2→B2→A3→B3→A4→B4→C1→D1→C2→D2→C3→D3→C4→D4.

After the control unit 410 completes writing the first part of data 810_31 and the second part of data 810_32, the control unit 410 sequentially writes the third part of data 810_33 and the fourth part of data 810_34 of the third allocation unit 810_3 into the fifth group 470_5.

As shown in FIG. 9, the second part of data 810_12, 810_22 and 810_32 of the first allocation unit 810_1, the second allocation unit 810_2 and the third allocation unit 810_3 are sequentially written into the two physical blocks 460_1 and 460_2 of the second group 470_2, so that according to the control method of the invention, the memory spaces of the first memory module 430 and the second memory module 450 can be effectively used. On the other hand, according to the method of interleavingly writing data into the physical regions of the physical blocks as that shown in FIG. 10C or FIG. 11, a data writing rate of the flash memory device 400 can be improved, and a system overhead can be reduced.

Figure 12:
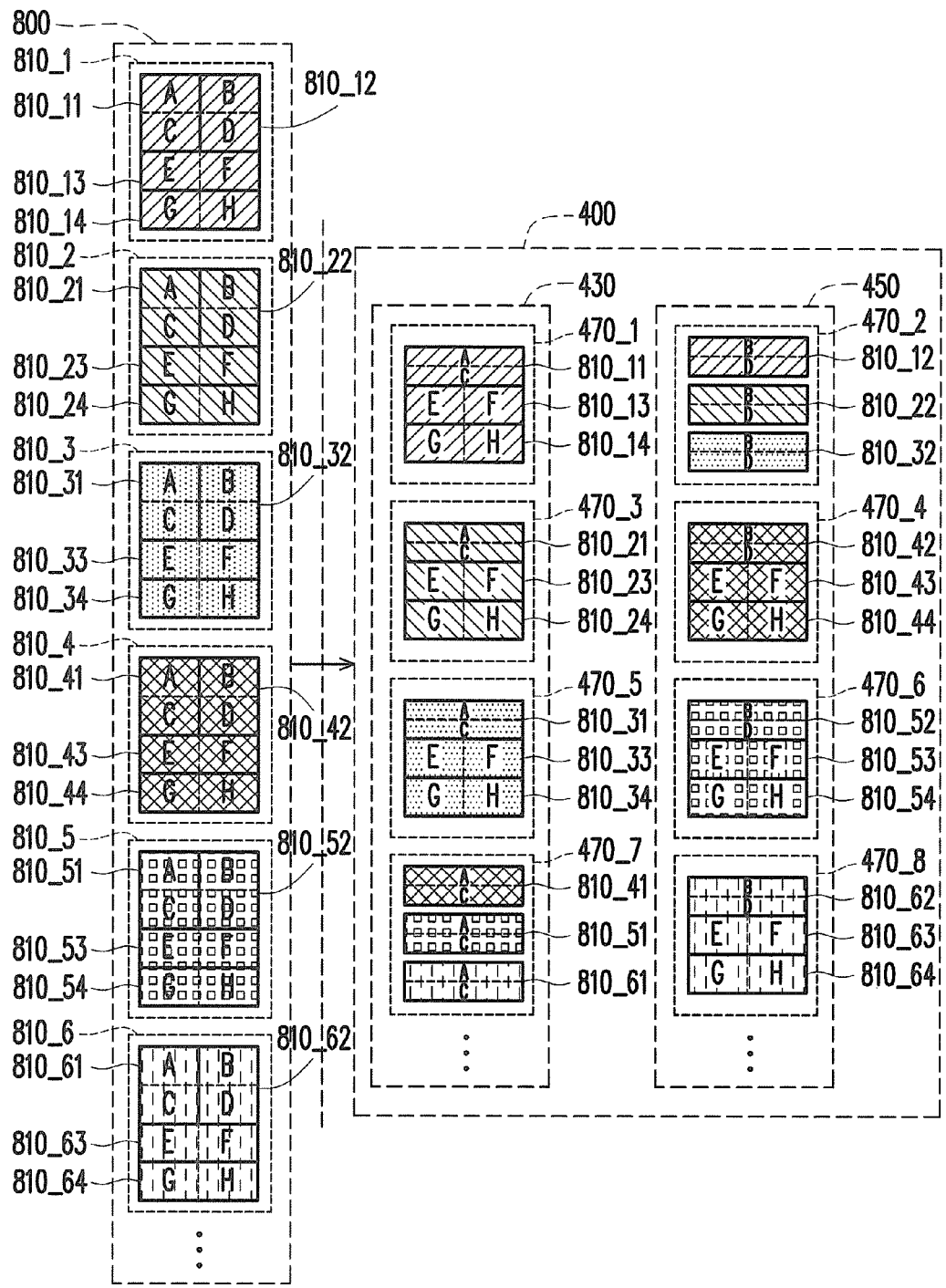
FIGS. 12-14 are schematic diagrams respectively illustrating a process of writing a data string into a flash memory device according to different embodiments of the invention.

Referring to FIG. 12 and referring to FIG. 4 and FIG. 5, FIG. 12 is a schematic diagram illustrating a process of writing the data string 800 into the flash memory device 400 according to an embodiment of the invention. In the present embodiment, a method of writing the first allocation unit 810_1, the second allocation unit 810_2 and the third allocation unit 810_3 into the first memory module 430 and the second memory module 450 is the same to the method of FIG. 8, so that a detailed description thereof is not repeated. In the present embodiment, the control unit 410 further writes the fourth allocation unit 810_4, a fifth allocation unit 810_5 and a sixth allocation unit 810_6 into the first memory module 430 and the second memory module 450. The control unit 410 first writes a first part of data 810_41 of the fourth allocation unit 810_4 into a seventh group 470_7 of the first memory module 430, and writes a second part of data 810_42 of the fourth allocation unit 810_4 into the fourth group 470_4 of the second memory module 450. The first part of data 810_41 and the second part of data 810_42 are interleavingly written into the seventh group 470_7 and the fourth group 470_4. Then, the control unit 410 sequentially writes a third part of data 810_43 and a fourth part of data 810_44 of the fourth allocation unit 810_4 into the fourth group 470_4.

Then, the control unit 410 writes a first part of data 810_51 of the fifth allocation unit 810_5 into the seventh group 470_7, and writes a second part of data 810_52 of the fifth allocation unit 810_5 into the sixth group 470_6 of the second memory module 450. The first part of data 810_51 and the second part of data 810_52 of the fifth allocation unit 810_5 are interleavingly written into the seventh group 470_7 and the sixth group 470_6. Then, the control unit 410 sequentially writes a third part of data 810_53 and a fourth part of data 810_54 of the fifth allocation unit 810_5 into the sixth group 470_6.

Similarly, the control unit 410 writes a first part of data 810_61 of the sixth allocation unit 810_6 into the seventh group 470_7, and writes a second part of data 810_62 of the sixth allocation unit 810_6 into the eighth group 470_8 of the second memory module 450. The first part of data 810_61 and the second part of data 810_62 of the sixth allocation unit 810_6 are interleavingly written into the seventh group 470_7 and the eighth group 470_8. Then, the control unit 410 sequentially writes a third part of data 810_63 and a fourth part of data 810_64 of the sixth allocation unit 810_6 into the eighth group 470_8.

Figure 13:
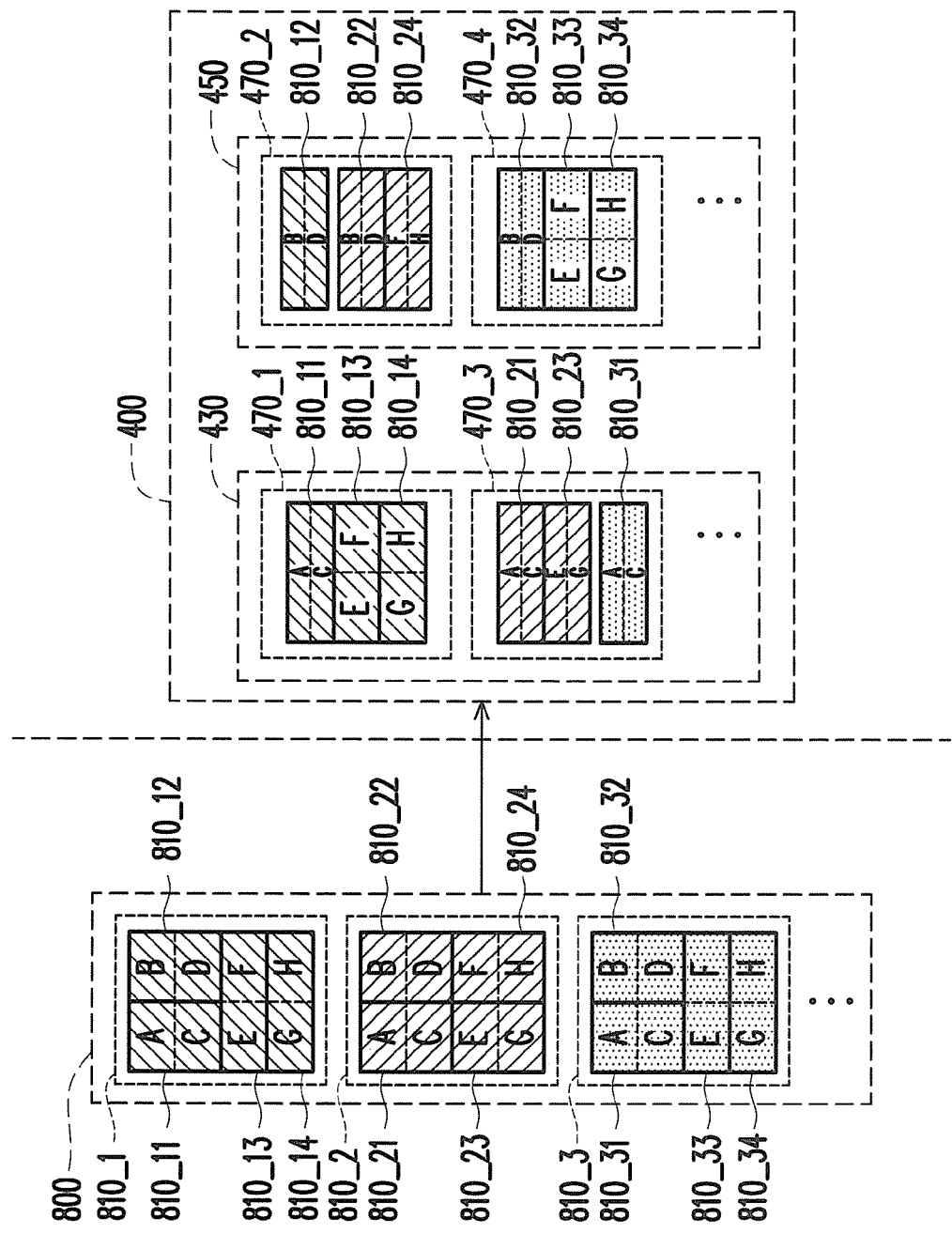

Referring to FIG. 13 and referring to FIG. 4 and FIG. 5, FIG. 13 is a schematic diagram illustrating a process of writing the data string 800 into the flash memory device 400 according to an embodiment of the invention. In the present embodiment, the control unit 410 interleavingly writes the first part of data 810_11 and the second part of data 810_12 of the first allocation unit 810_1 into the first group 470_1 and the second group 470_2. Then, the control unit 410 sequentially writes the third part of data 810_13 and the fourth part of data 810_14 of the first allocation unit 810_1 into the first group 470_1. Then, the control unit 410 interleavingly writes the first part of data 810_21 and the second part of data 810_22 of the second allocation unit 810_2 into the third group 470_3 and the second group 470_2. Then, the third part of data 810_23 and the fourth part of data 810_24 of the second allocation unit 810_2 are interleavingly written into the third group 470_3 and the second group 470_2. Thereafter, the control unit 410 interleavingly writes the first part of data 810_31 and the second part of data 810_32 of the third allocation unit 810_3 into the third group 470_3 and the fourth group 470_4. Then, the control unit 410 sequentially writes the third part of data 810_33 and the fourth part of data 810_34 of the third allocation unit 810_3 into the fourth group 470_4.

Figure 14:
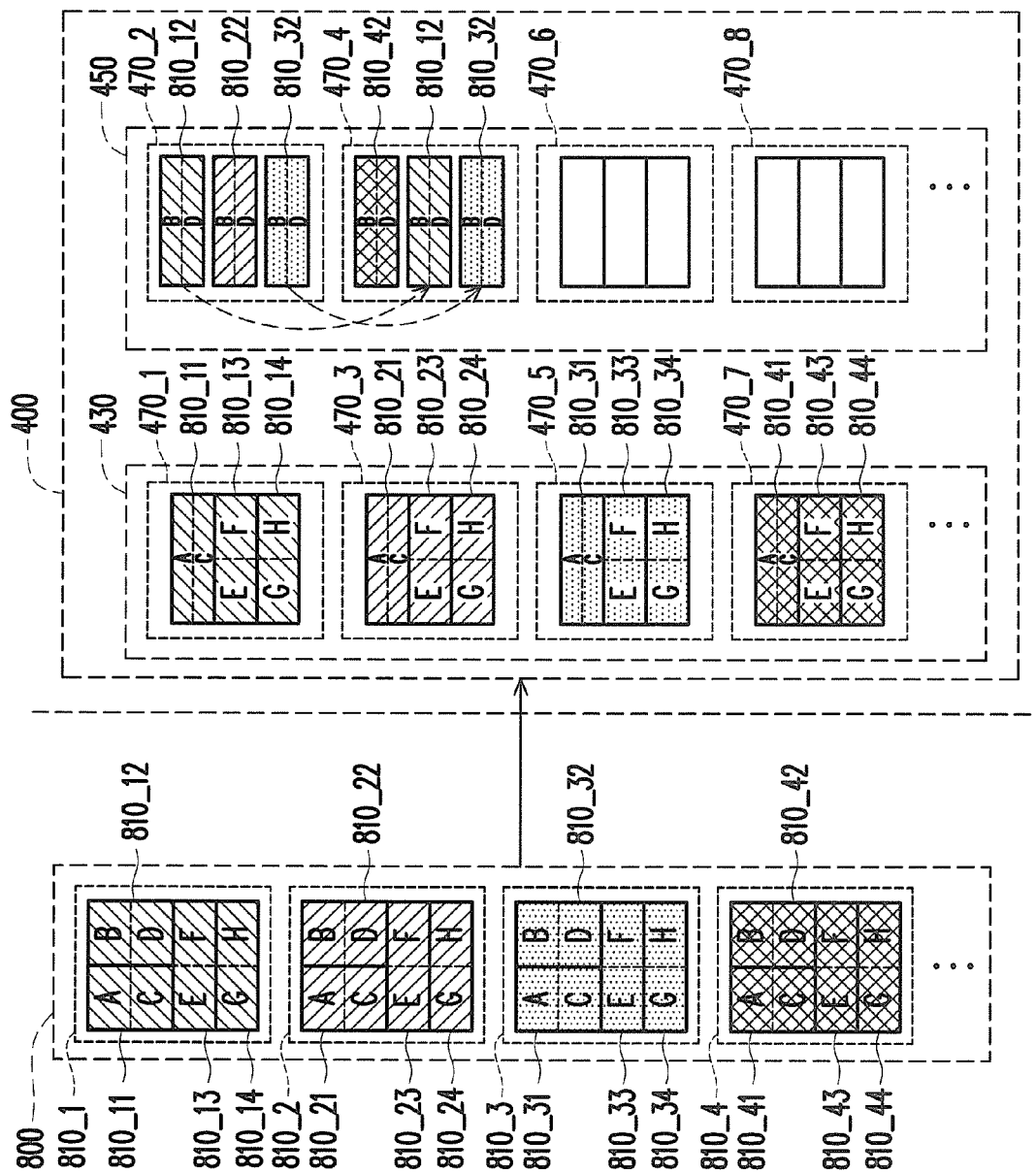

Referring to FIG. 14 and referring to FIG. 4 and FIG. 5, FIG. 14 is a schematic diagram illustrating a process of writing the data string 800 into the flash memory device 400 according to an embodiment of the invention. In the present embodiment, a method of writing the first allocation unit 810_1, the second allocation unit 810_2 and the third allocation unit 810_3 into the first memory module 430 and the second memory module 450 is the same to the method of FIG. 8, so that a detailed description thereof is not repeated. In the present embodiment, the fourth allocation unit 810_4 is used to replace the second allocation unit 810_2 already stored in the flash memory device 400. After the first allocation unit 810_1, the second allocation unit 810_2 and the third allocation unit 810_3 are written into the first memory module 430 and the second memory module 450, the first part of data 810_41 and the second part of data 810_42 of the fourth allocation unit 810_4 are interleavingly written into the seventh group 470_7 and the fourth group 470_4. Moreover, the control unit 410 reads the second part of data 810_12 of the first allocation unit 810_1 stored in the second group 470_2, and reads the second part of data 810_32 of the third allocation unit 810_3 stored in the second group 470_2. The read two batches of second part of data 810_12 and 810_32 are sequentially written (i.e. copied) to the fourth group 470_4. In the present embodiment, when the control unit 410 writes the third part of data 810_43 and the fourth part of data 810_44 of the fourth allocation unit 810_4 into the seventh group 470_7, the control unit 410 simultaneously copies the two batches of second part of data 810_12 and 810_32 of the second group 470_2 to the fourth group 470_4. After the third part of data 810_43 and the fourth part of data 810_44 of the fourth allocation unit 810_4 are completely written into the seventh group 470_7, the control unit 410 erases the data of the third group 470_3, so that the two physical blocks 440_3 and 440_4 of the third group 470_3 are available for storing other data. After the control unit 410 completes copying the second part of data 810_12 and 810_32, the control unit 410 erases the data of the second group 470_2, so that the two physical blocks 460_1 and 460_2 of the second group 470_2 are available for storing other data. In this way, when an odd allocation unit is replaced by a new allocation unit, according to the above data moving operation, a delay in the data accessing operation of the whole system can be reduced, so as to improve a data accessing rate.

In an embodiment of the invention, an allocation structure for the flash memory device 400 is further disclosed. The allocation structure includes a first zone and a second zone. The first zone is used for storing the first allocation unit 810_1, and the second zone is used for storing the second allocation unit 810_2. Taking FIG. 8 as an example, the first zone is formed by the first group 470_1 and a first part of the second group 470_2, and the second zone is formed by the third group 470_3 and a second part of the second group 470_2. The first part of the second group 470_2 is used for storing the second part of data 810_12 of the first allocation unit 810_1, and the second part of the second group 470_2 is used for storing the second part of data 810_22 of the second allocation unit 810_2. Moreover, if FIG. 13 is taken as an example, the first zone is formed by the first group 470_1 and a first part of the second group 470_2 used for storing the second part of data 810_12, and the second zone is formed by a part of the third group 470_3 used for storing the first part of data 810_21 and the third part of data 810_23 and a part of the second group 470_2 used for storing the second part of data 810_22 and the fourth part of data 810_24.

In an embodiment of the invention, the allocation structure further includes a third zone for storing the third allocation unit 810_3. Taking FIG. 8 as an example, the third zone is formed by the fifth group 470_5 and a third part of the second group 470_2, where the third part of the second group 470_2 is used for storing the second part of data 810_32 of the third allocation unit 810_3. Moreover, if FIG. 13 is taken as an example, the third zone is formed by a part of the third group 470_3 used for storing the first part of data 810_31 and the fourth group 470_4.

In the foregoing embodiments, each of the allocation units also could be divided into a plurality of subunits. Taking the embodiments of FIGS. 8 and 12-14 as examples, each part of data of each of the allocation units could be regarded as a subunit. In detail, in the above embodiments, each of the first parts of data could be regarded as a first subunit, each of the second parts of data could be regarded as a second subunit, each of the third parts of data could be regarded as a third subunit, and each of the fourth parts of data could be regarded as a fourth subunit. However, it should be noted that the way to arrange the subunits of the allocation units of the present invention is not limited thereto. As shown in FIGS. 8 and 12-14, each of the first parts of data of the allocation units could be divided into a first segment A and a second segment C, each of the second parts of data of the allocation units could be divided into a first segment B and a second segment D, each of the third parts of data of the allocation units could be divided into a first segment E and a second segment F, and each of the fourth parts of data of the allocation units could be divided into a first segment G and a second segment H. In an embodiment of the present invention, the first subunit of each allocation unit is composed of the first segment E of the third part of data and the first segment G of the fourth part of data of the corresponding allocation unit. The second subunit of each allocation unit is composed of the second segment F of the third part of data and the second segment H of the fourth part of data of the corresponding allocation unit. The third subunit of each allocation unit is composed of the first segment A of the first part of data and the first segment B of the second part of data of the corresponding allocation unit. The fourth subunit of each allocation unit is composed of the second segment C of the first part of data and the second segment D of the second part of data of the corresponding allocation unit. In such embodiment, the third subunit (i.e. segments A and B) and the fourth subunit (i.e. segments C and D) of the first allocation unit 810_1 are sequentially written into the first group 470_1. Moreover, the first subunit (i.e. segments E and G) and the second subunit (i.e. segments F and H) of the first allocation unit 810_1 are interleavingly written into the first group 470_1 and the second group 470_2, and the first subunit (i.e. segments E and G) and the second subunit (i.e. segments F and H) of the second allocation unit 810_2 are interleavingly written into the third group 470_3 and the second group 470_2.

In summary, a part of data of the allocation unit is written into the first memory module and the second memory module of the flash memory device according to a predetermined data writing method, so that a whole data writing rate can meet a requirement of an expected rate. Moreover, by planning the physical blocks of the memory module, the capacity of the memory can be effectively utilized.

It will be apparent to those skilled in the art that various modifications and variations can be made to the structure of the invention without departing from the scope or spirit of the invention. In view of the foregoing, it is intended that the invention cover modifications and variations of this invention provided they fall within the scope of the following claims and their equivalents.

What is claimed is:

1. A control method, adapted to a flash memory device, the flash memory device comprising a first memory module and a second memory module, and the control method comprising:

dividing a plurality of physical blocks of the first memory module into a plurality of groups, and dividing a plurality of physical blocks of the second memory module into a plurality of groups, wherein each of the groups of the first memory module has a plurality of the physical blocks of the first memory and each of the groups of the second memory has a plurality of the physical blocks of the second memory;

writing a first subunit of a first allocation unit into a first group of the groups of the first memory module, and writing a second subunit of the first allocation unit into a second group of the groups of the second memory module, wherein the first subunit of the first allocation unit and the second subunit of the first allocation unit are interleavingly written into the first group and the second group; and sequentially writing a third subunit and a fourth subunit of the first allocation unit into the first group.

2. The control method as claimed in claim 1, further comprising:

writing a first subunit of a second allocation unit into a third group of the groups of the first memory module, and writing a second subunit of the second allocation unit into the second group, wherein the first subunit of the second allocation unit and the second subunit of the second allocation unit are interleavingly written into the third group and the second group.

3. The control method as claimed in claim 2, further comprising:

writing a third subunit of the second allocation unit into the third group, and writing a fourth subunit of the second allocation unit into the second group, where the third subunit of the second allocation unit and the fourth subunit of the second allocation unit are interleavingly written into the third group and the second group.

4. The control method as claimed in claim 3, further comprising:

writing a first subunit of a third allocation unit into a third group of the groups of the first memory module, and writing a second subunit of the third allocation unit into a fourth group of the groups of the second memory module, wherein the first subunit of the third allocation unit and the second subunit of the third allocation unit are interleavingly written into the third group and the fourth group.

5. The control method as claimed in claim 4, further comprising:

sequentially writing a third subunit and a fourth subunit of the third allocation unit into the fourth group.

6. The control method as claimed in claim 2, further comprising:
: sequentially writing a third subunit and a fourth subunit of the second allocation unit into the third group.

7. The control method as claimed in claim 6, further comprising:
: writing a first subunit of a third allocation unit into a fifth group of the groups of the first memory module, and writing a second subunit of the third allocation unit into the second group, wherein the first subunit of the third allocation unit and the second subunit of the third allocation unit are interleavingly written into the fifth group and the second group.

8. The control method as claimed in claim 7, further comprising:
: sequentially writing a third subunit and a fourth subunit of the third allocation unit into the fifth group.

9. The control method as claimed in claim 8, further comprising:
: writing a first subunit of a fourth allocation unit into a seventh group of the groups of the first memory module, and writing a second subunit of the fourth allocation unit into a fourth group of the groups of the second memory module, wherein the first subunit of the fourth allocation unit and the second subunit of the fourth allocation unit are interleavingly written into the seventh group and the fourth group.

10. The control method as claimed in claim 9, further comprising:
: sequentially writing a third subunit and a fourth subunit of the fourth allocation unit into the fourth group.

11. The control method as claimed in claim 7, further comprising:
: writing a first subunit of a fourth allocation unit into a seventh group of the groups of the first memory module, and writing a second subunit of the fourth allocation unit into a fourth group of the groups of the second memory module, wherein the first subunit of the fourth allocation unit and the second subunit of the fourth allocation unit are interleavingly written into the seventh group and the fourth group; and
: copying the second subunit of the first allocation unit stored in the second group to the fourth group.

12. The control method as claimed in claim 11, further comprising:
: when the second subunit of the first allocation unit stored in the second group are copied to the fourth group, simultaneously writing a third subunit of the fourth allocation unit into the seventh group.

13. The control method as claimed in claim 11, wherein the step of copying the second subunit of the first allocation unit stored in the second group to the fourth group comprises:
: copying the second subunit of the first allocation unit and the second subunit of the third allocation unit stored in the second group to the fourth group.

14. The control method as claimed in claim 1, wherein data of one of the allocation units is of unequal-size stored in the physical blocks of the first memory module and the second memory module.

15. The control method as claimed in claim 1, wherein the flash memory device is a secure digital (SD) memory card.

16. The control method as claimed in claim 1, wherein the first memory module and the second memory module are two memory chips independent from each other.

17. The control method as claimed in claim 1, wherein the first memory module and the second memory module are two memory planes independent from each other, and are belonged to a same memory chip.

* * * * *